United States Patent [19]

van de Leemput

[11] 4,209,603

[45] * Jun. 24, 1980

[54] CATALYST ON A SUPPORT FOR THE POLYMERIZATION OF α-ALKENES, PARTICULARLY ETHENE

[75] Inventor: Lambertus J. M. A. van de Leemput, Gw Echt, Netherlands

[73] Assignee: Stamicarbon, B.V., Geleen, Netherlands

[*] Notice: The portion of the term of this patent subsequent to Mar. 27, 1996, has been disclaimed.

[21] Appl. No.: 924,435

[22] Filed: Jul. 13, 1978

[30] Foreign Application Priority Data

Jul. 18, 1977 [NL] Netherlands .................... 7707958
Jul. 18, 1977 [NL] Netherlands .................... 7707959

[51] Int. Cl.$^2$ .................... C08F 4/02; C08F 10/02
[52] U.S. Cl. .................... 526/129; 252/428; 252/430; 526/105; 526/352; 526/909
[58] Field of Search .................... 252/428, 458, 430; 526/106, 105, 129

[56] References Cited

U.S. PATENT DOCUMENTS

| | | | |
|---|---|---|---|
| 3,058,963 | 10/1962 | Van den Berg | 526/153 |
| 3,243,262 | 3/1966 | Carr et al. | 526/106 |
| 3,960,826 | 6/1976 | Aboutboul et al. | 526/106 |
| 4,037,042 | 7/1977 | Tamm et al. | 526/106 |
| 4,049,896 | 9/1977 | Rekers et al. | 526/129 |
| 4,119,569 | 10/1978 | Dietz | 526/107 |

*Primary Examiner*—Edward J. Smith
*Attorney, Agent, or Firm*—Cushman, Darby & Cushman

[57] ABSTRACT

An improved process and catalyst is described for polymerizing α-alkenes using a catalyst obtained by reacting a chromium-1,3-diketo complex compound having the general formula $$Cr(OCR_1CR_2CR_3O)_3,$$

with an organometallic compound, of a metal from Group II or III of the Periodic Table, contacting the reaction product with an inert inorganic support material, heating said reaction product on said support at a temperature of between about 200° and 1200° C. in a non-reducing atmosphere, combining the resulting product with an organometal compound of a metal from Group II or III of the Periodic Table. The catalysts are highly active and give high yields of polymer. By a proper selection of the pore volume and the particle size of the catalyst support polyalkenes of improved handling properties are obtained.

5 Claims, No Drawings

CATALYST ON A SUPPORT FOR THE POLYMERIZATION OF α-ALKENES, PARTICULARLY ETHENE

The invention relates to a process for polymerizing an α-alkene containing from 2 to 8 carbon atoms, optionally together with a minor quantity of at most about 10 mol percent of one or more other α-alkenes, also containing from 2 to 8 carbon atoms (preferably ethylene optionally together with at most about 2 moles % of propylene and/or butylene), in the presence of a catalyst obtained by reacting (a) a chromium-1,3-diketo complex compound having the general formula $$Cr(OCR_1CR_2CR_3O)_3$$

(in which $R_1$, $R_2$, $R_3$ are the same or different, and each represents an alkyl group containing from 1 to 10 carbon atoms, except that $R_2$ may represent an alkyl group of up to 20 carbon atoms, whilst $R_2$ may also represent a hydrogen atom) with (b) an organometallic compound, of a metal from Group II or III of the Periodic Table, in which hydrocarbyl groups containing from 1 to 20 carbon atoms are bound to the metal by a carbon atom. The thus-obtained reaction product is then contacted with an inert inorganic support material, and the reaction product of the chromium compound thereby deposited on said support is heated at a temperature of between about 200° and 1200° C. in a non-reducing atmosphere. The resulting product is fully combined with an organometallic compound of an element from Group II or III of the Periodic Table to form the said catalyst material.

A process of this type has been described in applicant's prior application U.S. Ser. No. 799,655 filed May 23, 1977, now U.S. Pat. No. 4,146,695.

The chromium compounds of the above formula are chromium complexes of the 1,3-diketo compounds of the general formula

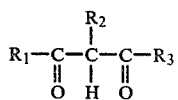

where $R_1$, $R_2$ and $R_3$ have the above significance. Such compounds include acetyl acetone; hexane-2,4-dione; heptane-2,4-dione; octane-2,4-dione; octane-3,5-dione and homologues of said compounds, and analogous compounds in which $R_2$ is an alkyl group with from 1 to 20 carbon atoms instead of a hydrogen atom. Preferably, the diketo compound is acetyl acetone and its chromium complex compound is chromium (III) acetyl acetonate.

A chromium-1,3-diketo compound of this type, preferably the chromium (III) acetyl acetonate, is converted with a hydrocarbyl organometallic compound of a metal from group II or III of the Periodic Table, such as beryllium, magnesium, boron, aluminum or gallium. The hydrocarbyl groups in these compounds are preferably alkyl groups with from 1 to 20 carbon atoms.

Particularly, suitable organometallic compounds are aluminum trialkyls and the magnesium dialkyls. The alkyl groups in the magnesium dialkyls preferably contain from 4 to 12 carbon atoms, and in particular 4 to 8 carbon atoms. Suitable organomagnesium compounds are diethyl magnesium, dipropyl magnesium, diisopropyl magnesium, dibutyl or diisobutyl magnesium, diamyl magnesium, dihexyl magnesium, dioctyl magnesium, didecyl magnesium, didodecyl magnesium, but also dicycloalkyl magnesium with the same or different cycloalkyl groups with 3 to 12 carbon atoms and, preferably 5 or 6 carbon atoms may be employed. Also, an alkyl group and a cycloalkyl group may both be attached to the magnesium. Although alkyl or cycloalkyl magnesium compounds are to be preferred, magnesium aryls may also be used, especially diphenyl magnesium, but also ditolyl and dixylyl magnesium. The diaryl magnesium compounds are generally poorly soluble or substantially insoluble in aliphatic hydrocarbons and are consequently dissolved in aromatic hydrocarbons. The organomagnesium compounds themselves may be prepared by methods already known (see, e.g., Organometallic Compounds; Vol. 1; G. E. Coates; M. L. H. Green and K. Wade; Organometallverbindungen; F. Runge). Use is made in particular of magnesium alkyl solutions prepared by the process of Netherlands Patent Specification No. 139,981.

Suitable aluminum compounds are aluminum trialkyls and organoaluminum compounds of the general formula $(R_4)_2AlX$, wherein $R_4$ denotes an alkyl group with from 1 to 10 carbon atoms and X denotes hydrogen or a halogen. Use may also be made of aluminum compounds containing one or more radicals derived from diene, which are already known from, e.g., German "Auslegeschriften" Nos. 1,956,353; 1,183,084; 1,136,113 and 1,186,633.

The conversion of the chromium-diketo complex compound, preferably the chromium (III) acetyl acetonate, with an organomagnesium or organoaluminum compound must be effected in a solvent that is inert with respect to these compounds. This conversion of the chromium compound with the organometallic compound is preferably effected in an aliphatically-saturated hydrocarbon solvent, more in particular in one or more aliphatic hydrocarbons such as hexane, heptane or a light gasoline substantially consisting of hexanes or heptanes. Use may also be made of lighter hydrocarbons, such as butanes and pentanes, and heavier hydrocarbons, especially petroleum fractions, such as gasoline, kerosine, and gas oil. Also other suitable solvents, such as halogenated hydrocarbons, may also be used as the reaction medium.

The chromium-1,3-diketo compounds and, notably, the chromium (III) acetyl acetonate are more soluble in aromatic hydrocarbons than in aliphatic hydrocarbons and they can readily be made to react with magnesium diaryls which are soluble in aromatic hydrocarbons. Because of the price of aromatic hydrocarbon solvents and especially because of their toxicity, their use is preferably avoided, in general, if adequate embodiments of the process in aliphatic and/or cycloaliphatic solvents can be used. Chromium (III) acetyl acetonate is less soluble in aliphatic and/or cycloaliphatic hydrocarbons but may be used in the form of a partial dispersion therein. If an organomagnesium or organoaluminum compound is added, the chromium (III) acetyl acetonate, or at least part of it, goes into solution, probably whilst forming a further complex compound with the organomagnesium or organoaluminum compound. The dissolution is promoted by heating gently, e.g., at temperatures of 40° to 100° C., or to the boiling point of the solvent in the case of those solvents with lower boiling points.

Chromium (III) acetyl acetonate in light gasoline imparts a light-violet color to it, as a small amount dissolves. A dark-colored solution is formed with the organomagnesium or organoaluminum compound.

In these solutions, the atomic Mg/Cr or Al/Cr ratio preferably ranges between 0.5/1 and 10/1, more in particular between 1/1 and 3/1.

Such a solution is admixed with an inert inorganic support, e.g., by slowly adding the solution with stirring to a support material suspended in the solvent. In a case when the chromium compound does not deposit from the solution onto the support, which is easily observable as the solution will then discolor and the support material will become colored, the chromium compound can be deposited on the support by evaporating the solvent. The support and the chromium compound deposited thereon are then separated from the vehicle or solvent by decanting, filtration, or evaporation, and then subsequently heated at temperatures of between 200° and 1200° C. in a non-reducing atmosphere.

The activity of such a catalyst material can vary widely. It appears that the activity is affected by the method of preparation of the chromium component and the choice of the starting materials for this component, and the temperature at which and the time for which the support is heated with the chromium component. The most favorable conditions can, however, easily be determined in each instance experimentally.

But even if such catalyst composition is prepared under otherwise similar conditions, the activities thereof are still found to differ widely when different supports are used.

In this invention, applicant has determined the combination of conditions to be controlled and satisfied by the support in order to produce catalysts on such support which have a consistently excellent activity for the polymerization of alkenes.

Thus, it has now been found that an α-alkene containing from 2 to 8 carbon atoms can be polymerized with high yields, whether or not together with minor amounts of at most 10 moles % of one or more other α-alkenes containing 2-8 carbon atoms (preferably ethylene, optionally together with small amounts of at most 2 moles % of propene and/or butene) in the presence of a catalyst obtained by reacting a chromium-1,3-diketo compound of the formula

$Cr(OCR_1CR_2CR_3O)_3$ in which $R_1$, $R_2$, $R_3$ are the same or different, and each represents an alkyl group containing 1-10 carbon atoms, whilst $R_2$ may also represent a hydrogen atom, with an organometallic compound of a metal from Group II or III of the Periodic Table, in which the hydrocarbyl groups containing 1-20 carbon atoms and are bound to the metal by a carbon atom, subsequently contacting the reaction product with an inert inorganic support, next heating the reaction product of the chromium compound deposited on the support at a temperature of between about 200° and 1200° C. in a non-reducing atmosphere, and then combining the resulting product with an organometallic compound of an element from Group II or III of the Periodic Table, wherein the support used is a silica having a pore volume of at least 1.5 cm³/g and a sodium content of at most 200 ppm (parts by weight per million parts by weight of support), which is characteristic of the invention.

Desirably also, the particle size of the catalyst support is at least 40μ, with a particle size distribution factor of at least 2, for best results, as described further below.

Silica useful for such supports, especially silica xerogels, are prepared by first forming a hydrogel from a sodium-silicate solution and an acid, usually sulphuric acid. Consequently, the gels containing much sodium must be carefully washed. See, e.g., German Offenlegungsschriften 2,411,734 and 2,411,735, Canadian Pat. No. 967,936, and U.S. Pat. Nos. 2,700,061; 2,763,533; 2,785,051; 3,041,140; 3,081,154; 3,428,425; 3,453,077; 3,652,214; 3,794,713 and 3,819,811.

However, slight amounts of sodium may yet remain, and this can have an unfavorable effect on the activity of the catalyst that is prepared by calcining the chromium compound on the support. When appreciable amounts of sodium are present, e.g., of about 500 ppm or more, sintering phenomena occur when the silica gel is heated at temperatures of about 800° to 950° C., which are the usual calcination temperatures, and the pore volume is considerably reduced.

Silica gels of this type having rather low pore volumes are not suitable as supports for the present catalysts of this invention. For instance, if sodium content is initially under 500 ppm, the pore volume may be decreased to a few tenths of cm³/g when the silica is heated at 900° C., but sometimes the decrease of the pore volume is limited and after calcining the silica at about 900° C. it may still amount to 1.5 cm³/g or more. Nevertheless, when the sodium content is over about 200 ppm the activity of catalysts on such supports still appears to be low. It is assumed, although this cannot be considered a statement that binds the applicant, that crystallization of such a silica gel occurs during heating and that this crystallization is detrimental to the formation of an active catalyst on such a support.

When the sodium content is less than about 200 ppm, the pore volume may decrease by some tenths of cm³/g during heating at, e.g., 900° C. These silica gels can be used to prepare active catalysts if the pore volume of the original gel is at least 1.5 cm³/g. The sodium content is preferably at most 150 ppm. Silica may occur in many different forms. Silica xerogels are the most suitable for the preparation of the present catalysts.

It has also proved to be advantageous to dry the silica to be used as a catalyst support, e.g., by heating in dry air, before the complex chromium compound is deposited on it. Such drying must be so effected that the support preferably contains no more physically bound water.

It also appears that even with the present supported catalysts, sometimes polyalkenes, and particularly polyethylenes are produced, with powder properties which are unsatisfactory, giving some problems in processing.

For instance, in funnel-shaped bunkers or hoppers, tunneling occurs easily. This appears to occur when the polyalkene contains considerable quantities of fines, giving dust problems in bulk trans-shipment and bulk transport. The content of such fines in such a product can amount to about 10 percent by weight or more.

It has also been found that in many cases the processing properties of polyalkene powders prepared with catalysts according to applicant's prior application U.S. Ser. No. 799.655 leave much to be desired even when the amounts of fine material were comparatively small. Applicant has found that the particle-size distribution is also important, and that the particle size distribution factor, usually represented by n, must also be at least 2.

It is therefore a further embodiment of the invention to produce polyalkene powders with good powder properties, i.e., low or negligible amounts of fines and with a particle size distribution factor of at least 2, by using as the catalyst support a silica support as hereinbefore described having an average particle size of at least 40 microns and a particle size distribution factor of at least 2.

Methods for the determination of the particle size and the particle size distribution are, of course, already known in the prior art, and are generally carried out by sieve analysis. The results of the sieve analysis can be represented graphically. According to Rosin and Rammler (Kolloid Zeitschrift 67 (1943) 16–26 and Chem. Eng. Techn. 24 (1942) 25–31), the particle-size distribution can be represented by the equation $$\frac{R}{100} = e^{-\left(\frac{x}{\bar{x}}\right)^n}$$

where R represents the fraction in percent by weight that is retained by a sieve of mesh width x and $\bar{x}$ represent the average particle size. After 2 logarithmic operations, the above equation changes into $\log(\log 100/R) = n \log \bar{x} - n \log x + \log (\log e)$, an equation that is represented by a straight line when plotted in a double logarithmic-logarithmic Rosin-Rammler diagram. For $x = \bar{x}$ it holds that $100/R = e$ or $R = 36.8\%$, i.e., the mesh of a sieve retaining 36.8% and allowing 63.2% to pass indicates the average particle size. Of course, no mesh width of a standard sieve will generally be similar to this value, but the average particle size is read from a Rosin-Rammler diagram on the line for which $R = 36.8$.

The particle size distribution factor n is a measure of the width of the distribution. The greater the value of n, the narrower the particle size distribution.

Polyalkylenes with favorable powder properties, i.e., requiring the combination of low amounts of fines (smaller than about 70 microns), with a narrow particle size distribution factor n of at least 2, can now be produced when the present catalyst supports also meet the above requirements as regards particle size (average at least 40μ) and particle-size distribution (factor of at least 2). An additional advantage is that the calcination of the support and the catalyst component deposited on it can well be effected in a non-reducing atmosphere by fluidizing the support in a hot air current. This is not feasible in the case of very fine supports and other methods must be used in which the supply of the non-reducing gas to the support particles is less good and the occurrence of local reducing conditions cannot be ruled out.

The amount of complex chromium compound described above that is deposited on the support may vary within wide limits, but generally amounts to from about 0.01% to 10% by weight, calculated as chromium on the support. A greater or smaller amount than that may be used, but offers no advantages. By preference, so much complex chromium compound is put on the support that its chromium content is 0.02 to 2% by weight, and, in particular, 0.05 to 1% by weight. After the complex chromium compound has been put in contact with the support in a vehicle, the support plus the deposited chromium compound are separated from the vehicle by evaporation, decantation or filtration.

When the chromium compound is not deposited on the support to a considerable extent, which appears from the fact that the vehicle does not or hardly at all discolor, the vehicle will be removed by evaporation. The non-reducing atmosphere in which the support with the chromium components is heated may be oxygen, air, nitrogen, carbon dioxide, or a noble gas. By preference, the non-reducing atmosphere in which the heating is effected is in fact an oxidizing medium, such as, e.g., oxygen or air, or air with an increased or decreased oxygen content.

The support with the chromium compound thereon is preferably heated at about 400° to 1200° C. and, more in particular, at about 500° to 1100° C. The duration of heating may vary from some seconds to dozens of hours or longer. At temperatures of 500° to 1100° C. the required heating time is generally from about 30 minutes to six hours. The optimum heating period in any given case can, however, readily be determined experimentally by preparing catalysts of equal compositions under otherwise similar conditions and varying the heating times at a given heating temperature, and then determining the properties of the final catalyst.

By preference, the support with the catalyst component, after being cooled to ambient temperature, is then distributed in a aliphatically-saturated hydrocarbon solvent, which is preferably the polymerization medium. This solvent may be composed of aliphatic or cyclic hydrocarbons, such as butane, isobutane, normal or branched pentanes, hexanes, heptanes, octanes, etc., cyclopentane, cyclohexane, cycloheptane, cyclooctane, etc., and mixtures, in particular fractions obtained directly or indirectly from petroleum fractions, such as light gasoline, gasoline, kerosine, or gas oil, which may contain aromatics, it is true, but substantially consist of aliphatics and/or cycloaliphatics.

Technically, aromatic hydrocarbons, such as benzene, toluene, xylenes, or halogenated hydrocarbons can also very well be used, but for practical reasons, viz., the price and the toxicity, preference will generally be given to aliphatic hydrocarbons or petroleum fractions.

An organometallic compound of an element from Group II or III of the Periodic Table, such as beryllium, magnesium, boron, aluminum or gallium, is added to the chromium component on the support, which is dispersed in an inert vehicle.

The molar ratio beween the organometallic compound and the chromium component on the support may vary within wide limits, e.g., from 0.1:1 to 200:1. The ratios are preferably between about 5:1 and 40:1.

The polymerization of α-alkenes with the catalysts according to the invention is preferably effected in an inert vehicle under such conditions that a suspension of the polymer in the vehicle is obtained. In the polymerization of ethene this involves that the polymerization temperature chosen is generally below about 110° C., preferably below 100° C., and more in particular at most 90° C. In highly volatile solvents, such polymerization is found to be possible even at 110° C. or a still higher temperature. However, the polymerization can also be effected at higher temperatures, e.g., from 150° to 200° C., when a solution of polythene in the vehicle is generally obtained, which can then be processed in ways already known. The polymerization can also be effected as a so-called gaseous-phase polymerization, embodiments of which are known, i.e., from British Patent Specification No. 1,373,982.

The polymerization of propene and higher olefins may also be effected in the liquid monomer itself.

To obtain a proper polymerization rate, the polymerization will usually be effected at elevated temperature, e.g., 50° C. or higher, preferably at temperatures of at least 70° C.

The polymerization may be effected at atmospheric pressure, but also elevated pressure may be used, particularly when use is made of solvents with low boiling points, such as butane, isobutane, pentane. Higher yields can be obtained by effecting the polymerization under pressure, so that elevated pressures of up to, e.g., 100 kg/cm$^2$, will generally be used. Higher pressures, even up to, e.g., 2000 kg/cm$^2$ or higher, are possible, but will not generally be used for practical reasons.

The polymerization is preferably effected at pressures of between 6 and 80 kg/cm$^2$, and, more in particular, of between 12 and 50 kg/cm$^2$. The amount of catalyst is generally so chosen that the vehicle contains 0.001 to 10 mmoles, and preferably about 0.01 to 1 mmole, of chromium per liter of vehicle.

The suspension or solutions obtained from such polymerization in a solvent can then be processed in ways already known.

In the present polymerization process use may also be made of modifications that are already known in themselves. For instance, the molecular weight may be controlled by adding hydrogen or other modifying agents conventionally used for this purpose.

The polymerization may also be effected in two or more stages, either in parallel or in series, in which, if so desired, different catalyst compositions, temperatures, retention times, pressures, hydrogen concentrations, etc., may be used. Thus, products with a wide molecular weight distribution can be prepared by so choosing the conditions in the one stage that a polymer with a high molecular weight is formed, while the conditions in the other stage are so chosen that a polymer with a comparatively low molecular weight is formed.

The invention will now be further elucidated by the following Examples, without, however, being restricted by them.

COMPARATIVE EXAMPLE a. Preparation of the Catalyst 20.78 grams of chromium (III) acetyl acetonate (59.5 mmoles) are suspended in 400 ml of dry light gasoline (boiling range 65°–85° C.) in a 1-liter flask provided with a stirrer, a reflux condenser and an inlet. This suspension is heated with stirring until the gasoline boils, after which 45 ml of pure triisobutyl aluminum (TIBA) are added drop-wise. The resulting solution has a dark brown-green color and contains only traces of solids.

After filtration, 15.5 ml of the solution thus obtained are added drop-wise to a suspension of 20 grams of Ketjen F-5 in 250 ml in dry gasoline. The Ketjen F-5 has been pre-dried, i.e., heated at 200° C. for 4 hours under air, which was then replaced by dry nitrogen.

Ketjen F-5 is a silica gel with a pore volume of 1.25 cm$^3$/g and a sodium content of 220 ppm, which is put on the market by Ketjen.

After a short time the dark-colored solution has lost color and the silica support has taken on color. The silica support with the chromium compound deposited on it is separated from the vehicle by evaporating the light gasoline, after which the resulting powder is dried in vacuo at 50° C. for 16 hours. Next, the powder is heated at 900° C. in a rotary oven under a flow of dry air. It takes about 1 hour to reach 900° C. and the powder is kept at this temperature for 6 hours. After cooling, the catalyst powder is suspended in so much gasoline that the concentration is 10 grams of catalyst on support per 100 ml of gasoline. A fraction of the catalyst powder calcined at 900° C. is analyzed and is found to contain 0.53% by weight of chromium and 0.83% by weight of aluminum.

b. Polymerization of Ethene 1500 ml of dry gasoline are put in a stirred autoclave (3.2 liters), and then 5 ml of catalyst suspension are added. Next, 0.4 ml of a 1-M TIBA solution in gasoline is added, after which the reactor is closed and the pressure in it is raised by means of ethene with 5% of hydrogen. The autoclave contents are heated to 85° C. and the polymerization is carried out for 90 minutes at a total pressure of 4 atm.

The yield of polythene amounts to only 5 grams, which corresponds to an activity of 30 grams of polythene per mmole of chromium per atmosphere of ethene and per hour.

The pore volume of the Ketjen F-5 support was determined, after it had been heated at 900° C. in the same way as the support with catalyst. It was only 0.16 cm$^3$/g.

INVENTIVE EXAMPLES ILLUSTRATING IMPROVED CATALYST ACTIVITY

EXAMPLE 1 a. Preparation of the Catalyst

The process of the Comparative Example is repeated, but with 15.5 ml of complex chromium-compound solution added drop-wise to a suspension of 15 grams of washed Ketjen F-7 in 250 ml of dry gasoline.

The Ketjen F-7 used is a silica gel with a pore volume of 2.0 cm$^3$/g and a sodium content of 500 ppm, which is put on the market by Ketjen. In this experiment, use was made of a Ketjen F-7 whose sodium content had been reduced to 5 ppm by an additional washing treatment of the gel. The pore volume was 1.6 cm$^3$/g.

The pore volume was substantially unchanged after this silica gel had been heated at 900° C. for 6 hours.

After a short time the dark-colored solution has lost color and the silica support has taken on color. The silica support with the chromium compound deposited on it is separated from the vehicle by evaporating the light gasoline, after which the resulting powder is dried in vacuo at 50° C. for 16 hours. Next, the powder is heated at 900° C. in a rotary oven under a flow of dry air.

It takes about 1 hour to reach 900° C. and the powder is kept at this temperature for 6 hours. After cooling, the catalyst powder is suspended in so much gasoline that the concentration is 0.0048 mmole of chromium per liter of gasoline. A fraction of the catalyst powder calcined at 900° C. is analyzed and is found to contain 0.50% by weight of chromium and 0.78% by weight of aluminum.

b. Polymerization of Ethene 1500 ml of dry gasoline are put in a stirred autoclave (3.2 liters) and then 10 ml of catalyst suspension are added. Next, 0.3 ml of a 1-M TIBA solution in gasoline is added, after which the reactor is closed and the pressure in it is raised by means of ethene with 10% of hydrogen. The autoclave contents are heated at 85° C.

and the polymerization is carried out for 90 minutes at a total pressure of 7 atmospheres.

This time the yield of polythene amounts of 195 g, which corresponds to an activity of 575 grams of polythene per mmole of chromium per atmosphere of ethene and per hour (i.e., over 19 times the activity of the Comparative Examples).

EXAMPLE 2

The polymerization of Example 1 was repeated but with the modification that so much catalyst suspension was put in the autoclave that the chromium concentration was 0.016 mmole/liter. Furthermore, 0.3 ml of 1-M TIBA solution was added. The result was an yield of 101 grams, of polythene, which corresponds to an activity of 595.

EXAMPLE 3 a. Preparation of a Catalyst 2 grams of chromium (III) acetyl acetonate (5.75 mmoles) are suspended in 500 ml of dry light gasoline (boiling range 65°–85° C.) in a 1-liter flask provided with a stirrer, a reflux condenser and an inlet. This suspension is heated with stirring until the gasoline boils, after which 2.2 ml of a 3.91 molar solution (8.61 mmoles) of triisobutylaluminum (TIBA) is added drop-wise. The resulting solution has a dark brown-green color and contains only traces of solids.

After filtration, 210 ml of the solution thus obtained are added drop-wise to a suspension of 60 grams of Aerosil 200 V in 900 ml of dry gasoline. The Aerosil 200 V had been pre-dried, i.e., heated at 120° C. for 16 hours.

Aerosil 200 V is a commercial silica gel of Degussa with an average particle size of 6$\mu$ and a particle size distribution factor n of 1.5. It has a pore volume of 3 cm$^3$/g and a negligible sodium content.

After a short time the dark-colored solution has lost color and the silica support has taken on a color. The silica support with the chromium compound deposited on it is separated from the vehicle by evaporating the light gasoline, after which the resulting powder is dried in vacuo at 50° C. for 16 hours. Next, the powder is heated at 900° C. in a rotary oven under a flow of dry air.

It takes about 1 hour to reach 900° C. and the powder is kept at this temperature for 1 hour. After cooling, the catalyst powder is suspended in so much gasoline that the concentration is 5 grams of catalyst on support per 100 ml of gasoline. A fraction of the catalyst powder calcined at 900° C. is analyzed and is found to contain 0.24% by weight of chromium and 0.23% by weight of aluminum.

b. Polymerization of Ethene 1500 ml of dry gasoline are put in a stirred autoclave (3.2 liters), and then 40 ml of the catalyst suspension are added. Next, 0.4 ml of a 1-M TIBA solution in gasoline is added, after which the reactor is closed and the pressure in it is raised by means of ethene with 5% of hydrogen. The autoclave contents are heated to 85° C. and the polymerization is carried out for 1 hour at a total pressure of 4 atm.

The yield of polythene amounts to 192 g, which corresponds to an activity of 973 g per mmole of chromium per atmosphere of ethene pressure and per hour.

The sieve analysis of the polythene gave the following results: 5% by weight<40$\mu$; 11% by weight<70$\mu$; 22% by weight<125$\mu$; 48% by weight<250$\mu$; 73% by weight<420$\mu$, and 87% by weight<600$\mu$.

It is calculated from these results that the average particle size is 400$\mu$ and the particle size distribution factor is 1.3. This polythene contains over 10% by weight of fine material, and, in addition, 13% of powder with a particle size of over 600$\mu$. The polythene so produced can, however, readily give rise to arching or bridging in hoppers or bunkers.

EXAMPLE 4 a. Preparation of the Catalyst

A catalyst was prepared as described in Example 3, but with the amount of chromium acetyl acetonate being 5.7 mmoles and 8.5 mmoles of dibutyl magnesium being used instead of triisobutyl aluminum. The catalyst contains 0.22% by weight of chromium and 0.19% by weight of magnesium on Aerosil 200 V.

b. Polymerization of Ethene

Ethene was polymerized in the same way as in Example 3, while 1.2 ml of 1-M triisobutyl aluminum were added to the polymerization medium. 154 grams of polymer were obtained, which corresponds to an activity of 853. Sieve analysis gave the following results: 4% by weight smaller than 50$\mu$; 9% by weight smaller than 70$\mu$; 18% by weight smaller than 125$\mu$; 42% by weight smaller than 250$\mu$; 67% by weight smaller than 420$\mu$, and 84% by weight smaller than 600$\mu$. It is calculated from these results that the average particle size is 400$\mu$ and the particle size distribution factor n is 1.4. As in Example 3, the polythene powder can, however, readily give rise to arching or bridging in hoppers.

INVENTIVE EXAMPLES ILLUSTRATED IMPROVED POLYTHENE PARTICLE SIZE

EXAMPLE 5 a. Preparation of the Catalyst 20.78 grams of chromium (III) acetyl acetonate (59.5 mmoles) are suspended in 400 ml of dry light gasoline (boiling range 65°–85° C.) in a one-liter flask provided with a stirrer, a reflux condenser and an inlet.

This suspension is heated with stirring until the gasoline boils, after which 45 ml of pure triisobutylaluminum (TIBA) are added dropwise. The resulting solution has a dark brown-green color and contains only traces of solids. After filtration, 15.5 ml of the solution thus obtained are added dropwise to a suspension of 20 grams of washed Ketjen F-7 in 250 ml of dry gasoline. The washed Ketjen F-7 had been predried, i.e., heated at 120° C. for 16 hours.

This sample of Ketjen F-7 is a silica gel with a pore volume of 2.1 cm$^3$/g and a sodium content of 500 ppm, which is put on the market by Ketjen. This support used as such gave only slight yields with activities of less than 100 g of polythene per mmole of chromium per atmosphere of ethene pressure and per hour. In this experiment use was made of a Ketjen-7 whose sodium content had been reduced to 5 ppm by an additional washing treatment of the gel, after which the pore volume was now 1.6 cm$^3$/g. The average particle size is 110, the particle size distribution factor n is 2.0. If this silica gel is heated at 900° C. for 6 hours, the pore volume does not change. If the unwashed Ketjen-7 is heated at 900° C. for 6 hours, the pore volume drops from 2.1 to 1.7 cm$^3$/g.

After a short time the dark-colored solution has lost color and the silica support has taken on color. The silica support with the chromium compound deposited on it is separated from the vehicle by evaporating the light gasoline, after which the resulting powder is dried in vacuo at 50° C. for 16 hours. Next, the powder is heated at 900° C. in a rotary oven under a flow of dry air.

It takes about 1 hour to reach 900° C. and the powder is kept at this temperature for 6 hours. After cooling, the catalyst powder is suspended in so much gasoline that the concentration is 0.0048 mmole of chromium per liter of gasoline. A fraction of the catalyst powder calcined at 900° C. is analyzed and is found to contain 0.50% by weight of chromium and 0.78% by weight of aluminum.

b. Polymerization of Ethene 1500 ml of dry gasoline are put in a stirred autoclave (3.2 liters), and then 10 ml of catalyst suspension are added. Next, 0.3 ml of a 1-M TIBA solution in gasoline is added, after which the reactor is closed and the pressure in it is raised by means of ethene with 10% of hydrogen. The autoclave contents are heated to 85° C. and the polymerization is carried out for 90 minutes at a total pressure of 7 atmospheres.

The yield of polythene amounts to 195 grams, which corresponds to an activity of 575 g of polythene per mmole of chromium per atmosphere of ethene pressure and per hour.

The sieve analysis of the polythene gives the following results: 0% by weight<40μ; 0% by weight<70μ; 5% by weight<125μ; 25% by weight<250μ; 55% by weight<420μ; 85% by weight<600μ. It is calculated from these results that the average particle size is 480μ and the particle size distribution factor is 2.1.

EXAMPLE 6

Example 5 was repeated on the understanding that only 5 ml of catalyst suspension were put in the reactor. The yield was 101 g, which corresponds to an activity of 595.

According to the sieve analysis, the polythene powder contains 0% by weight<40μ; 0% by weight<70μ; 4% by weight<125μ; 25% by weight<250μ; 55% by weight<420μ and 87% by weight<600μ, from which a particle size of 460μ and a particle size distribution factor of 2.5 are calculated.

EXAMPLE 7 a. Preparation of Catalyst

The process of Example 5 was repeated, but with 20 grams of Crossfield MC used as the support material. Crossfield MC is a silica xerogel with a pore volume of 1.6 cm³/g, a sodium content of 140 ppm, an average particle size of 150μ and a particle size distribution factor of 5, which is put on the market by Joseph Crossfield & Sons Ltd. (UK). After being heated at 900° C. for 6 hours, Crossfield MC still has a pore volume of 1.57 cm³/g.

b. Polymerization of Ethene

The polymerization is effected by the process of Example 5b with a chromium concentration of 0.010 mmole per liter in the polymerization reactor. 0.6 ml of 1-M TIBA was added to the reactor.

The yield was 91 grams, which corresponds to an activity of 900. According to sieve analysis: 0% by weight<40μ; 0% by weight<70μ; 4.8% by weight<125μ; 30% by weight<250μ; 65% by weight<420μ and 97% by weight<600μ, from which an average particle size of 370μ and a particle size distribution factor of 3.0 are calculated.

EXAMPLE 8

Example 7 was repeated but with amount of the solution of chromium (III) acetyl acetonate and triisobutyl aluminum added to 14.1 grams of Crossfield MC, such that the amounts of chromium and aluminum are 0.70% by weight and 1.09% by weight.

So much catalyst is put in the autoclave that the chromium concentration is 0.018 mmole per liter; moreover, 0.3 ml of 1-M TIBA solution is added. The yield is 165 g, which corresponds to an activity of 840.

The polythene powder obtained is very coarse. An average particle size of 950μ and a particle size distribution factor of 4 to 4.5 are calculated from the sieve analysis.

The polythene powders produced from Examples 5 through 8 are free flowing with significantly less tendency towards arching, bridging or tunneling during handling operations as in delivery from bunkers or hoppers.

It will be seen from the foregoing Examples that by using the process of this invention, significantly improved activities and yields are realized, and also a polyethylene product of improved powder or particle size characteristics and other properties is achieved.

What is claimed is:

1. In processes for polymerizing an α-alkene containing from 2 to 8 carbon atoms, together with a minor quantity of at most 10 mole % of one or more other α-alkene co-monomers containing from 2 to 8 carbon atoms, the improvement consisting essentially in using a catalyst obtained by reacting a chromium-1,3-diketo compound of the formula

$$Cr(OCR_1CR_2CR_3O)_3$$

in which $R_1$, $R_2$, $R_3$ each independently represent an alkyl group containing from 1 to 10 carbon atoms, and $R_2$ may also represent a hydrogen atom,
with an organometallic compound of a metal from Group II or III of the Periodic Table in a hydrocarbon or halogenated hydrocarbon solvent,
  wherein hydrocarbyl groups containing from 1 to 20 carbon atoms are bound to the metal atom via a carbon atom,
subsequently contacting the resulting hydrocarbon or halogenated hydrocarbon soluble reaction product with an inert inorganic support material,
  composed of silica having a pore volume of at least 1.5 cm³/g and a sodium content of at most 200 ppm,
next heating the reaction product of the chromium compound deposited on the said silica support at a temperature of between about 200° and 1200° C. in a non-reducing atmosphere, and thereafter combining the resulting product with an organometallic compound of an element from Group II or III of the Periodic Table.

2. The process of claim 1 wherein said silica support has an average particle size of at least 40 microns and a particle size distribution factor of at least 2.

3. The process of claim 1 wherein the sodium content of the said silica support is at most 150 ppm.

4. A catalyst for polymerizing α-alkenes which consists essentially of the product obtained by reacting a chromium-1,3-diketo compound of the formula $$Cr(OCR_1CR_2CR_3O)_3$$

in which $R_1$, $R_2$, $R_3$ each independently represent an alkyl group containing from 1 to 10 carbon atoms, and $R_2$ may also represent a hydrogen atom, with an organometallic compound of a metal from Group II or III of the Periodic Table in a hydrocarbon or halogenated hydrocarbon solvent,
  wherein hydrocarbyl groups containing from 1 to 20 carbon atoms are bound to the metal atom via a carbon atom,
subsequently contacting the resulting hydrocarbon or halogenated hydrocarbon soluble reaction product with an inert inorganic support material,
  composed of silica having a pore volume of at least 1.5 cm³/g and a sodium content of at most 200 ppm,
next heating the reaction product of the chromium compound deposited on the said silica support at a temperature of between about 200° and 1200° C. in a non-reducing atmosphere, and thereafter combining the resulting product with an organometallic compound of an element from Group II or III of the Periodic Table.

5. The catalyst of claim 4 wherein said silica support has an average particle size of at least 40 microns and a particle size distribution factor of at least 2.

* * * * *